US011675802B1

(12) United States Patent
Wang et al.

(10) Patent No.: US 11,675,802 B1
(45) Date of Patent: Jun. 13, 2023

(54) GRAPHICAL USER INTERFACE AND FLEXIBLE ARCHITECTURE FOR A RULE ENGINE

(71) Applicant: STARBUCKS CORPORATION, Seattle, WA (US)

(72) Inventors: Ita Eddie Wang, Seattle, WA (US); Christopher Estes, Seattle, WA (US); Ehudes Fernan Garcia Gil, Puyallup, WA (US); Krishna Sumanth Chagarlamudi, Seattle, WA (US); Clayton Timothy Brandt, Seattle, WA (US)

(73) Assignee: Starbucks Corporation, Seattle, WA (US)

( * ) Notice: Subject to any disclaimer, the term of this patent is extended or adjusted under 35 U.S.C. 154(b) by 0 days.

(21) Appl. No.: 18/072,854

(22) Filed: Dec. 1, 2022

(51) Int. Cl.
*G06F 17/30* (2006.01)
*G06F 16/25* (2019.01)
*G06F 3/0482* (2013.01)
*G06F 16/28* (2019.01)

(52) U.S. Cl.
CPC .......... *G06F 16/25* (2019.01); *G06F 3/0482* (2013.01); *G06F 16/284* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | |
|---|---|---|---|
| 2012/0047008 A1 | 5/2012 | Alhadeff et al. | |
| 2012/0209783 A1* | 8/2012 | Smith, Jr. | G06Q 20/384 705/308 |
| 2020/0082485 A1 | 3/2020 | Hinshaw | |
| 2021/0150560 A1 | 5/2021 | Gupta et al. | |
| 2021/0182896 A1* | 6/2021 | Marangu | G06Q 20/4014 |
| 2023/0011585 A1 | 1/2023 | Rai et al. | |

OTHER PUBLICATIONS

U.S. Appl. No. 18/072,860, Non-Final Office Action dated Feb. 2, 2023, 11 pages.

* cited by examiner

*Primary Examiner* — Hung D Le
(74) *Attorney, Agent, or Firm* — Kilpatrick Townsend & Stockton LLP

(57) ABSTRACT

One example of the present disclosure can include a system configured to provide a graphical user interface that includes a set of graphical input elements for receiving a selected condition and a selected action for a new rule. The system can generate a new rule definition for the new rule based on the selected condition and the selected action. The system can store the new rule definition in a rule database. The system can then select a subset of rule definitions from the rule database. The system can apply the subset of rule definitions to user data to determine whether the user data matches the subset of rule definitions. If the user data matches a rule definition, the system can execute at least one action associated with the rule definition.

23 Claims, 9 Drawing Sheets

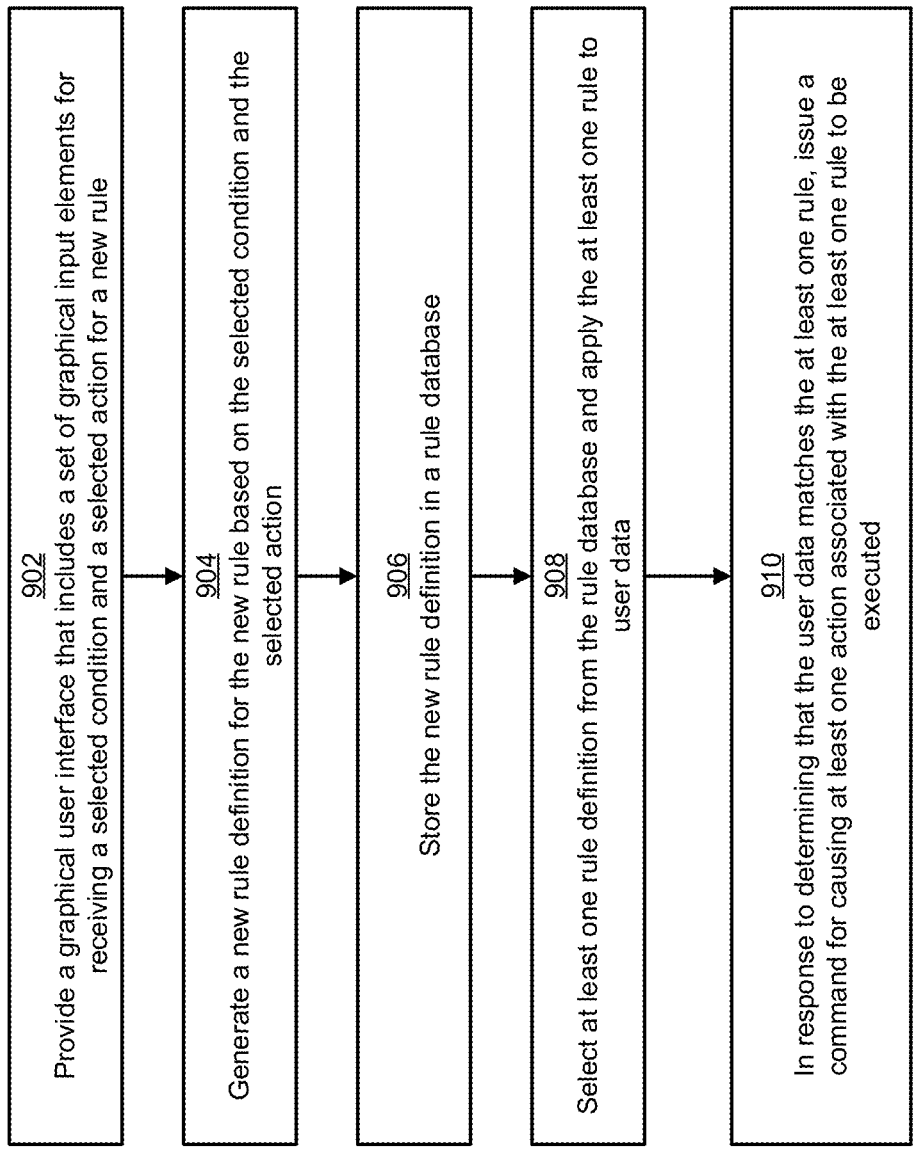

GRAPHICAL USER INTERFACE AND FLEXIBLE ARCHITECTURE FOR A RULE ENGINE

TECHNICAL FIELD

The present disclosure relates generally to rule engine software that is executable on a computer. More specifically, but not by way of limitation, this disclosure relates to a graphical user interface and flexible architecture for a rule engine usable to assign points to online accounts.

BACKGROUND

A rule engine can include executable software configured to apply predefined rules to user data to determine whether the user data matches the rules. If so, the rule engine then takes some predefined actions corresponding to the rules. A single rule can include one or more conditions and one or more corresponding actions to be executed if the conditions are satisfied. The rule engine may apply hundreds of thousands of such rules to the user data and execute one or more corresponding actions depending on which rules match the user data.

SUMMARY

One example of the present disclosure includes a non-transitory computer-readable medium comprising program code that is executable by one or more processors for causing the one or more processors to perform operations. The operations can include providing a graphical user interface that includes a set of graphical input elements for receiving a selected condition and a selected action for a new rule. The operations can include generating a new rule definition for the new rule based on the selected condition and the selected action. The operations can include storing the new rule definition in a rule database, the rule database including a plurality of rule definitions for a plurality of rules. The operations can include executing a rule engine configured to: select a subset of rule definitions from the plurality of rule definitions in the rule database, wherein the subset of rule definitions includes the new rule definition, and wherein the subset of rule definitions correspond to a subset of rules from among the plurality of rules; and apply the subset of rule definitions to user data to determine whether the user data matches the subset of rules. The operations can include, in response to determining that the user data matches at least one rule in the subset of rules, issuing a command for causing at least one action associated with the at least one rule to be executed.

Another example of the present disclosure can include a method involving operations. The operations can include providing a graphical user interface that includes a set of graphical input elements for receiving a selected condition and a selected action for a new rule. The operations can include generating a new rule definition for the new rule based on the selected condition and the selected action. The operations can include storing the new rule definition in a rule database, the rule database including a plurality of rule definitions for a plurality of rules. The operations can include executing a rule engine configured to: select a subset of rule definitions from the plurality of rule definitions in the rule database, wherein the subset of rule definitions includes the new rule definition, and wherein the subset of rule definitions correspond to a subset of rules from among the plurality of rules; and apply the subset of rule definitions to user data to determine whether the user data matches the subset of rules. The operations can include, in response to determining that the user data matches at least one rule in the subset of rules, issuing a command for causing at least one action associated with the at least one rule to be executed. Some or all of the operations can be implemented by one or more processors.

Still another example of the present disclosure includes a system comprising one or more processors and one or more memories. The one or more memories can include instructions that are executable by the one or more processors for causing the one or more processors to perform operations. The operations can include providing a graphical user interface that includes a set of graphical input elements for receiving a selected condition and a selected action for a new rule. The operations can include generating a new rule definition for the new rule based on the selected condition and the selected action. The operations can include storing the new rule definition in a rule database, the rule database including a plurality of rule definitions for a plurality of rules. The operations can include selecting a subset of rule definitions from the plurality of rule definitions in the rule database, wherein the subset of rule definitions includes the new rule definition, and wherein the subset of rule definitions correspond to a subset of rules from among the plurality of rules. The operations can include applying the subset of rule definitions to user data to determine whether the user data matches the subset of rules. The operations can include, in response to determining that the user data matches at least one rule in the subset of rules, issuing a command for causing at least one action associated with the at least one rule to be executed.

BRIEF DESCRIPTION OF THE DRAWINGS

FIG. 9 shows a flowchart of an example of a process for providing a graphical user interface and a flexible architecture for a rule engine according to some aspects of the present disclosure.

DETAILED DESCRIPTION

Figure 1:
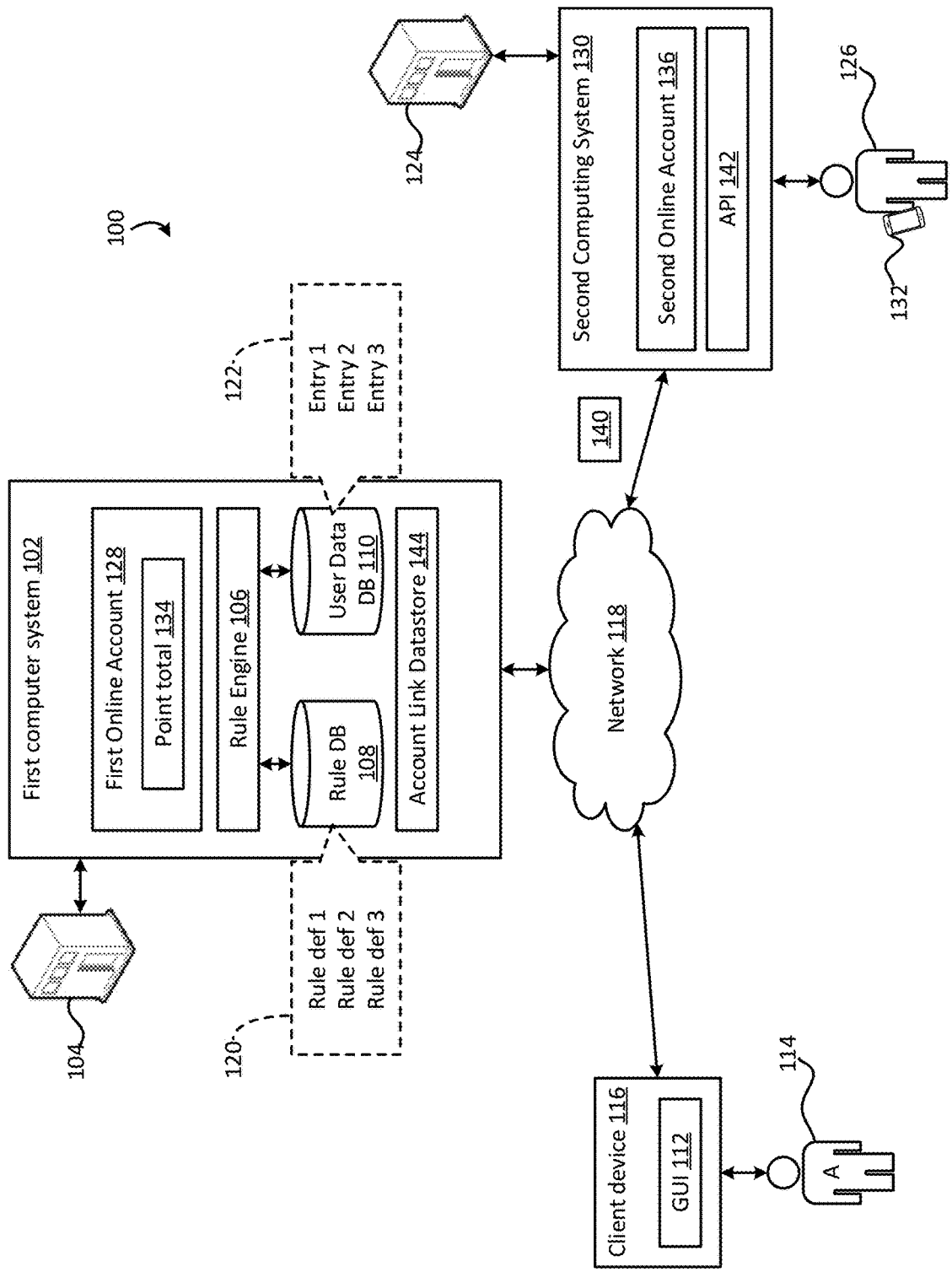
FIG. 1 shows a block diagram of an example of a system for providing a graphical user interface and a flexible architecture for a rule engine according to some aspects of the present disclosure.

A conventional rule engine can be software in which a predefined set of rules are hardcoded into the software prior to compilation or execution of the software. For example, a software developer may program the rules directly into the source code for the rule engine. The software developer may also program an order in which the rules are to be applied directly into the source code. But this approach can lack flexibility and lead to a variety of issues. For example, each time the rules need to be modified (e.g., to add or remove a rule), the rule engine may need to be shutdown, manually reprogrammed by a skilled programmer, recompiled, and then redeployed on the computer system. This process can make it cumbersome to modify the rules. The resulting downtime, while the rule engine is being updated and redeployed on the computer system, may also be problematic for a variety of reasons.

In addition to the above challenges, it can take a significant amount of time and expertise to manually program a large number of rules (e.g., hundreds or thousands of rules) into a conventional rule engine. Doing so can also significantly increase the length and complexity of the source code, making it harder to understand and maintain. Longer and more complex source code can make it more likely that human errors will be introduced into the source code, resulting in functional problems in the rule engine. Longer and more complex source code can also increase the time required to compile the source code and the amount of computing resources consumed during the compilation process. Once compiled, the larger source code files can also produce larger binary files that consume more memory space.

Not only can the above issues arise during the programming of a conventional rule engine, but other issues can also arise during the runtime of the rule engine. For example, hardcoding the rules into the source code can result in the same rules being applied the same way every time, which is inflexible and may unnecessarily consume computing resources (e.g., processing power and RAM) by applying irrelevant rules. This brute-force approach, in which all rules are applied the same way every time, can drain computing resources and yield suboptimal results.

Some examples of the present disclosure can overcome one or more of the abovementioned problems by providing a graphical user interface and flexible architecture for a rule engine that can simplify the process of adjusting rules for the rule engine. Using the graphical user interface and flexible architecture, the rules can be dynamically adjusted while the rule engine is running, without having to shut down, reprogram, or recompile the rule engine itself.

In some examples, the graphical user interface can include a set of graphical input elements through which a user can define the parameters of a rule. Examples of the graphical input elements can include text boxes, radio buttons, checkboxes, etc. The parameters can include the conditions of the rules and the corresponding actions to be taken if those conditions are satisfied. The graphical user interface can enable a non-programmer to easily define a rule using a simple graphical interface. The system can then translate the user's selections into a rule definition, which can define the parameters of the rule in a format that is compatible with the rule engine. The rule definition can then be stored in a rule database, which is separate from but accessible to the rule engine. The rule database can by dynamically adjusted during the runtime of the rule engine to add or remove rules. Storing the rules in a separate rule database can improve the flexibility of the rule engine. And since the rules are maintained in the separate rule database (rather than hardcoded into the rule engine), the length and complexity of the rule engine's source code can be reduced, thereby making the rule engine faster to update, compile, and run, and less susceptible to human error.

At runtime, the rule engine can access the rule database, select a subset of rules to apply for a given set of user data, and apply the rules. The rule engine can select a subset of rules to apply to the set of user data through an intelligent filtering process, which can be designed to reduce the total number of rules applied to the user data. This can help conserve computing resources and result in faster execution and improved performance as compared to the brute-force approach of conventional rule engines.

The rule engine can be used to perform a wide variety of tasks. For example, the rule engine can be configured to apply point adjustments to online accounts of users. In some such examples, each user may have an online account with an entity, such as a company. The users may perform various operations that are linked their online accounts. For example, the users may engage in interactions (e.g., transactions) that are linked to their online accounts. In some such examples, the rule engine can receive data about thousands of such interactions performed by thousands of users per minute. The rule engine may receive and analyze each interaction. The analysis can be conducted in substantially real time. For example, the rule engine can select a subset of rules from the rule database to apply to a given interaction using an intelligent filtering process. The rule engine can then analyze the interaction data against the subset of rules to determine which, if any, rules match the interaction. If a rule matches the interaction, the corresponding action can be executed by the rule engine. The action may include adjusting a point total for an online account of the user that engaged in the interaction. For example, the rule engine can add points to or remove points from the point total associated with the user's online account. If multiple rules match the interaction, the rule engine can prioritize among the corresponding actions based on their characteristics and perform some or all of the corresponding actions. This process may be iterated for each interaction, until all of the interactions have been analyzed.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a system 100 for providing a flexible rule engine according to some aspects of the present disclosure. The system 100 includes a first computer system 102 operated by a first entity 104. The first computer system 102 can include any number and combination of networked computing devices, such as physical servers or virtual servers.

The first computer system 102 can include a rule engine 106 configured to apply rules to user data 122. The rules can be defined using rule definitions 120 that are stored in a rule database 108. Each rule can be described using a rule definition that includes one or more conditions and one or more corresponding actions to be executed if the conditions are satisfied. The user data 122 can be stored in a user data database 110. The rule engine 106 can retrieve the rule definitions 120 from the rule database 108, apply them to some or all of the user data 122, and execute one or more corresponding actions depending on which of the rules match the user data 122. For example, the rule engine 106 can load some or all of the rule definitions 120 into a local memory, such as RAM or cache memory. The rule engine 106 can also load some or all of the user data 122 into the local memory. The rule engine 106 can then select a loaded piece of user data for analysis against the loaded rule definitions. The rule engine 106 can apply some or all of the loaded rule definitions to the piece of user data to detect any matches. If a match is detected, the rule engine 106 can execute an action corresponding to the matched rule definition. Additionally or alternatively, the rule engine 106 can issue a command to a second computing system 130 for causing the second computing system 130 to execute the action.

The rule definitions can be formatted for use by the rule engine 106. For example, the rule definition can be stored in a JavaScript Object Notation (JSON) format, eXtensible Markup Language (XML) format, or another predefined format so that it can be easily interpreted and applied by the rule engine 106. The rule engine 106 can be configured to accept rule definitions in this predefined format and understand the syntax of the format.

Because the rule definitions may not be easily interpretable or draftable for a human, particularly if a rule definition is long and complex, a graphical user interface 112 can be provided to simplify the process of creating new rules. More specifically, the rule engine 106 can provide a graphical user interface 112 to an administrator 114 for use in adding new rules to the rule database 108. The administrator 114 can operate a client device 116 to access the graphical user interface 112 via a network 118, such as the Internet. Examples of the client device 116 can include a laptop computer, desktop computer, mobile phone, tablet, e-reader, or wearable device such as a smart watch. The graphical user interface 112 can be output on a display of the client device 116.

The graphical user interface 112 can allow the administrator 114 to easily add new rules to the rule database 108. For example, the graphical user interface 112 can include a form with a set of graphical input elements, such as text boxes, radio buttons, and checkboxes. The administrator 114 can interact with the graphical input elements to define the parameters of a new rule. The parameters can include one or more conditions of the rule and one or more corresponding actions to be executed if those conditions are satisfied. For example, the administrator 114 can interact with the graphical user interface 112 to select a date from a calendar, an account type from a pulldown menu, and a service type from another pulldown menu. These may be the conditions of the rule—e.g., that the rule is triggered by users that have an account of the selected type and accessed the selected service on the selected date. The administrator 114 can also interact with the graphical user interface 112 to select at least one action to execute if the conditions of the rule are satisfied. For example, the graphical user interface 112 can include a pulldown menu that indicates different types of actions that can be executed. Some of the actions may be configured to be performed by a remote computing system, such as the second computing system 130. The graphical user interface 112 can also include an input box for defining the details of a selected type of action. The administrator 114 interact with the pulldown menu and input box to, for example, select that a specific number of points are to be awarded to an account of a user that satisfies the conditions of the rule. Once the administrator 114 has made the appropriate selections, the administrator 114 can push a button to submit the form.

The first computer system 102 can detect that the form has been submitted, interpret the form data, and generate a rule definition based on the form data. The rule definition can be a set of content that defines the new rule. For example, the rule definition can include the one or more conditions and the one or more actions selected by the administrator 114. As noted above, the rule definition can be formatted for use by the rule engine 106, which will ultimately access and apply the rule. After generating the new rule definition (i.e., the rule definition for the new rule), the first computer system 102 can store the new rule definition in the rule database 108. The first computer system 102 can also store additional metadata about the new rule, such as the creator and creation date of the new rule. Through this process, one or more administrators 114 can easily add new rules to the rule database 108.

In some examples, the graphical user interface 112 can also allow the administrator 114 to easily remove existing rules from the rule database 108. For example, the graphical user interface 112 can automatically populate a list some or all of the existing rules in the rule database 108. The graphical user interface 112 can also include one or more filtering options through which the administrator 114 can identify one or more existing rules that match the filter criteria. For example, the administrator 114 can filter the rules by their creator, creation date, conditions, actions, or any combination of these. After identifying a rule to delete, the administrator 114 can select an option to delete the rule. In response, the first computer system 102 can remove the corresponding rule definition from the rule database 108. In some examples, the administrator 114 can select an option to pause application of a rule, rather than deleting the rule altogether. This may allow the administrator 114 to easily resume application of the rule at a later time, without having to recreate the rule from scratch. If the administrator 114 selects the pause option, the first computer system 102 can mark the corresponding rule definition as "paused" in the rule database 108. The rule engine 106 may be configured to ignore paused rules when evaluating the user data 122. At a later point in time, the administrator 114 can reactivate the rule via the graphical user interface 112, at which point the first computer system 102 may remove the "pause" marking from the corresponding rule definition in the rule database 108.

The graphical user interface 112 may be generated at least in part by a software program running on the client device 116. For example, the software program can be a native application, and the graphical user interface 112 can be built into the native application. As another example, the software program can be a website browser, and the graphical user interface 112 can be part of a website rendered in the website browser. In some examples, the graphical user interface 112 may be generated at least in part by the first computer system 102. For example, the first computer system 102 may generate and transmit webpage code (e.g., HTML, CSS, or JavaScript) to the client device 116, where the webpage code defines some or all of the graphical user interface 112. The client device 116 can receive the webpage code and render it using a website browser, thereby producing some or all of the graphical user interface 112.

The administrator 114 may be any suitable person. For example, the administrator 114 may be an employee of the first entity 104 that is operating the first computer system 102. Alternatively, the administrator 114 may be an employee of a second entity 124, where the first entity 104 is different than the second entity 124. The first entity 104 may provide different types of offerings (e.g., products and services) than the second entity 124. For example, the first entity 104 may be a coffee company and the second entity 124 may be an airline. In some cases, multiple administrators from multiple different entities 104, 124 may have access to the graphical user interface 112 for adding new rules to the rule database 108.

In some examples, the actions associated with the rules may involve adjusting points associated with an account.

For example, a user 126 can have an online account 128 with the first entity 104. The online account 128 can be hosted on the first computer system 102. The user 126 can operate a user device 132 to access the online account 128. For example, the user 126 can operate the user device 132 to connect to the first computer system 102 via the network 118, to thereby access the online account 128. Examples of the user device 132 can include a laptop computer, desktop computer, mobile phone, tablet, e-reader, or wearable device such as a smart watch. The online account 128 may have a point total 134. The points may be non-monetary rewards issued by the first entity 106a and/or the second entity 124. Points may be added to or removed from the point total 134 for various reasons, such as user data 122 associated with the user 126 matching one or more rules defined in the rule database 108. Examples of the user data 122 can include attributes of user 126 (e.g., the user's age, location, or other characteristics), attributes of the first online account 128 (e.g., a type, priority, age, level, or account history associated with the online account 128), or any combination of these.

As one particular example, the user 126 can engage in an interaction with the second entity 124. The user 126 can choose to link the interaction to their online account 128. For example, the user 126 may login to their online account 128 using the user device 132 and initiate the interaction using the user device 132, which may cause the interaction to be linked to (e.g., associated with) the online account 128. Engaging in the interaction may involve the user 126 interacting with a second computer system 130 of the second entity 124. For example, the user 126 may operate the user device 132 to transmit commands to an application programming interface (API) 142 of the second entity 124, where the commands can facilitate the interaction. Based on the interaction, the second computing system 130 or the user device 132 can generate interaction data 140. The interaction data 140 can be considered a type of user data 122. The interaction data 140 can include various details about the interaction, such as its date and time, a unique identifier of the second entity 124, a unique identifier of the user 126, and a unique identifier of an offering associated with the interaction. The interaction data 140 can be transmitted in a data communication to the first computer system 102. The rule engine 106 can receive and analyze the interaction data 140 for matches to one or more rule definitions 120. For each matched rule definition, the rule engine 106 can execute a corresponding action and/or issue a command for causing a remote computing system to execute a corresponding action. For example, the rule engine 106 can determine that the interaction data 140 triggers a certain rule based on the date, offering, and entity associated with the interaction. The rule engine 106 can then execute a corresponding action, which may for example involve increasing the point total 134 by a predefined amount. In this way, the user 126 can be automatically rewarded for engaging in the interaction. Of course, other rule definitions may include actions that decrease the point total 134.

If multiple rules match the user data 122 associated with a given user 126, the rule engine 106 can prioritize among the corresponding actions and perform some or all of the corresponding actions. For example, the rule engine 106 may determine that two rules match the interaction data 140 associated with the user 126. The rule engine 106 can identify the actions corresponding to the matched rules and prioritize among the actions using a predefined prioritization policy. The prioritization policy can assign priority levels to different actions based on their characteristics. Using this policy, the rule engine 106 can determine a prioritized execution sequence that defines an order in which the actions are to be executed. The rule engine 106 can then execute the prioritized execution sequence so that the actions are performed in the appropriate order. If two actions conflict with one another, the rule engine 106 can select one of the two actions to execute based on the prioritization policy and ignore the other action. Two actions may conflict when, for example, they award different amounts of points for the same set of conditions. In some such examples, the larger award may be selected over the smaller award.

In some examples, the rule database 108 can include a large number of rule definitions. For example, the rule database 108 may include thousands of rule definitions associated with dozens of entities. It may therefore be desirable to perform some intelligent filtering to reduce the total number of rules applied to the user data 122 to reduce the latency and computational overhead of the system. For example, certain rules may be associated with certain entities. As one particular example, a particular subset of the rule definitions 120 may only be triggered for interactions associated with the second entity 124, and thus may not be triggered for interactions with other entities. Other entities may likewise have their own unique sets of rules. In some such examples, the rule engine 106 can select which set of rules is to be applied based on whichever entity is associated with the user data 122 (e.g., interaction data 140) being evaluated. This can dramatically reduce the total number of rules applied to the user data 122 and, consequently, the computational overhead associated with evaluating that user data 122.

In some examples, the user 126 may have both the first online account 128 with the first entity 104 and a second online account 136 with the second entity 124. The second online account 136 can be hosted on the second computing system 130 of the second entity 124. In some such examples, the rule engine 106 may only apply the rule definitions associated with the second entity 124 if the user's first online account 128 is linked to the second online account 136. To link the first online account 128 to the second online account 136, the system 100 may perform an account-linking process. An example of the account-linking process is described in greater detail later on with respect to FIGS. 4-8. Links generated via the account-linking process can be saved in an account link datastore 144. The rule engine 106 can access the account link datastore 144 to determine whether the first online account 128 is linked to the second online account 136. If so, the rule engine 106 may apply the rule definitions associated with the second entity 124 to the user data 122. If the first online account 128 is not linked to the second online account 136, the rule engine 106 may skip the rule definitions associated with the second entity 124. By only applying rule definitions related to linked online accounts, the total number of rules applied to the user data 122 can be significantly reduced. This can be considered another type of intelligent filtering.

Although FIG. 1 shows a certain number and arrangement of components for simplicity, this is intended to be illustrative and non-limiting. Other examples may include more components, fewer components, different components, or a different arrangement of the components than is shown in FIG. 1. For instance, other examples may involve thousands of users interacting with thousands of entities distributed all over the world. Those entities may stream user data about the interactions to the first computer system 102 for analysis by the rule engine 106. Some or all of those users may have respective online accounts with the first entity 104 that are linked to other online accounts associated with the other entities (e.g., the second entity 124).

Figure 2:
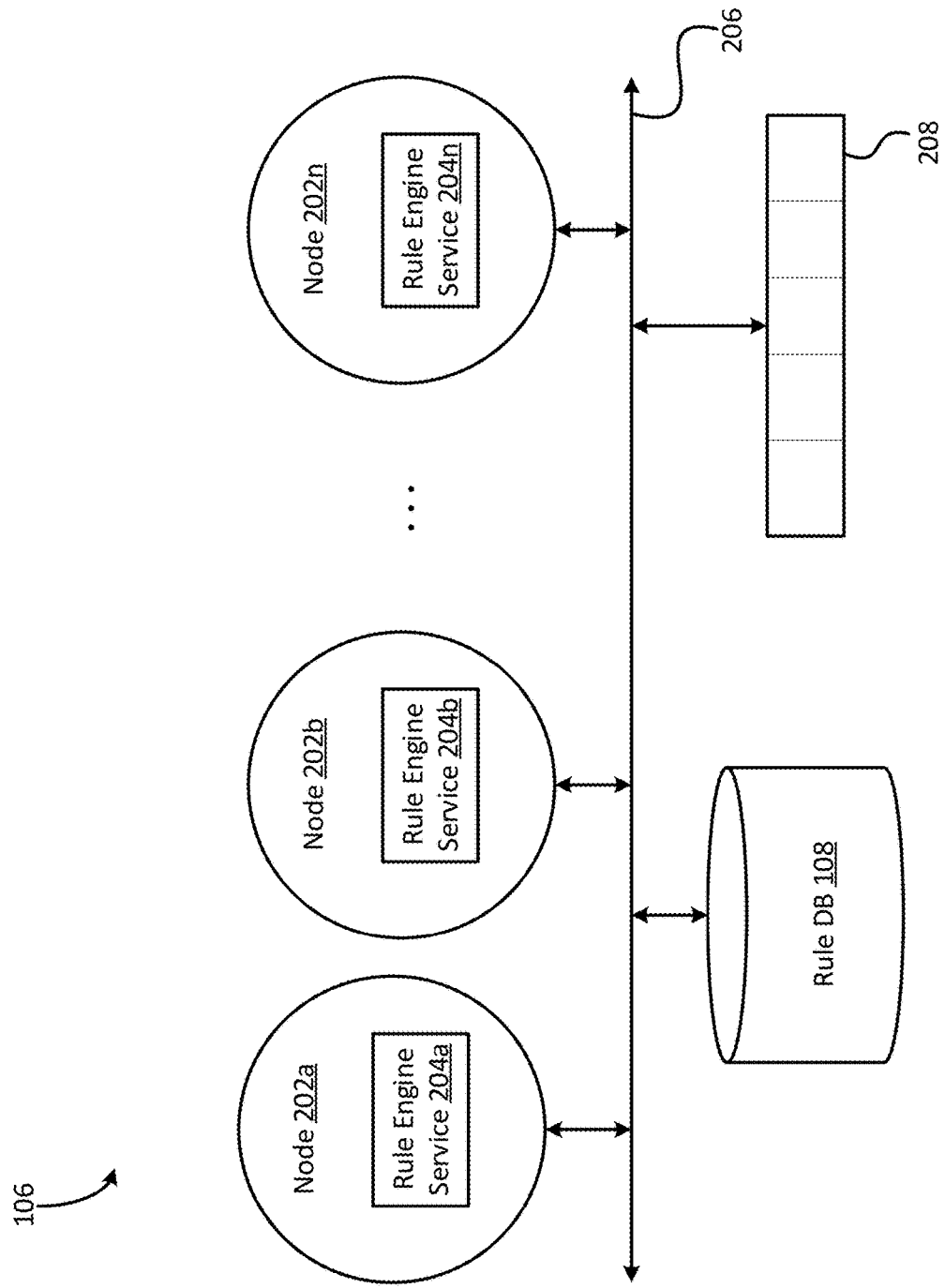
FIG. 2 shows a block diagram of an example of a rule engine according to some aspects of the present disclosure.

FIG. 2 shows an example of the inner workings of the rule engine according to some aspects of the present disclosure. As shown, the rule engine 106 can include any number and combination of nodes 202a-n, such as physical servers or virtual servers. The nodes 202a-n can be in communication with one another via a network 206, such as a local area network, the Internet, or both. The nodes 202a-n can be part of a distributed computing environment, such as a cloud computing environment or a computing cluster. Each of the nodes 202a-n can execute a rule engine service 204a-n configured to perform at least some of the rule matching described above. The rule engine services 204a-n can be any suitable types of software services, such as microservices or serverless functions. The rule engine services 204a-n can each access the rule database 108, retrieve one or more rule definitions therefrom, and store the rule definitions in a local memory of the corresponding node. Examples of the local memory can be RAM or cache memory. Storing the rule definitions in a local memory can allow the nodes 202a-n to avoid repeatedly fetching the same rule definitions, thereby reducing bandwidth consumption and latency in the system.

The rule definitions may be divided and distributed among the nodes 202a-n, for example so that each of the nodes 202a-n can process a substantially equal number of rule definitions. This can help achieve load balancing among the nodes 202a-n. Since each rule definition can be applied independently of the other rule definitions, the nodes 202a-n may be able to process the user data in parallel to achieve enhanced speed. Depending on the amount of user data and the amount of rule definitions, the number of nodes 202a-n can be dynamically and automatically scaled up or down to meet demand.

In some examples, the user data can be stored in a queue 208 for evaluation. An example of the queue 208 can be an Apache Kafka® queue. The queue may be a first-in-first-out queue or another type of queue. The rule engine 106 can organize the user data among one or more queues. The rule engine 106 can automatically and dynamically scale the number of queues depending on the amount and types of user data to be evaluated.

The rule engine services 204a-n can work together to retrieve user data from the queue(s) 208, divide and process the user data, and execute any actions that are triggered by matched rules. In some examples, a node 202a (e.g., its rule engine service 204a) can retrieve user data from the queue 208, determine that the user data does not correspond to any of the its rule definitions stored in local memory, and transmit the user data to another node 202b that may have one or more rules related to the user data. For example, a first node 202a may store all of the rules related to a first entity, and a second node 202b may store all of the rules related to a second entity. If the user data relates to the second entity and not the first entity, the node 202a can skip over the evaluation process and forward the user data to the second node 202b for evaluation. Alternatively, if the user data relates to the second entity and the first entity, the node 202a can perform its evaluation process and then forward the user data to the second node 202b for additional evaluation. In this way, the nodes 202a-n can pass user data among one another for evaluation as needed.

Figure 3:
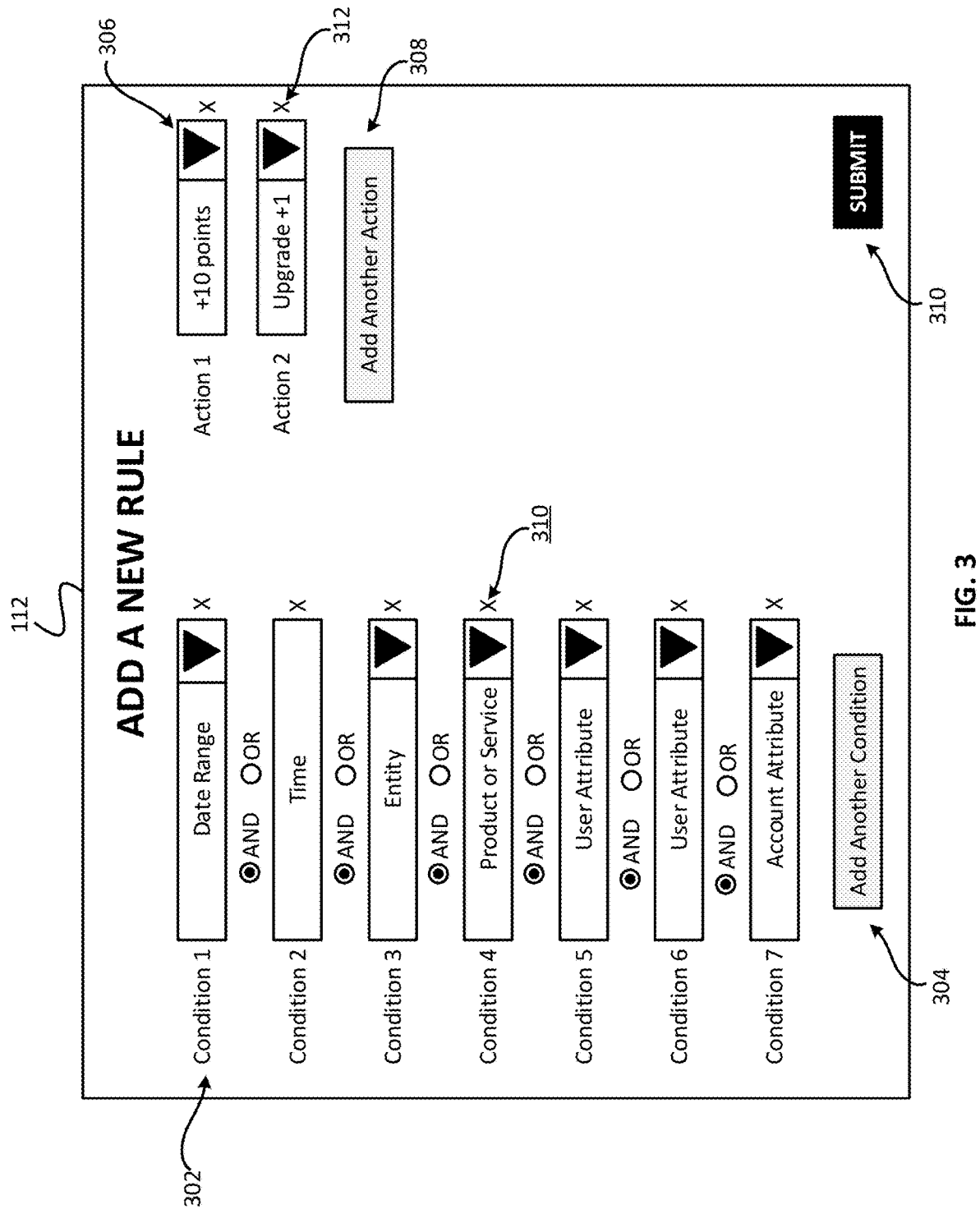
FIG. 3 shows an example of a graphical user interface for adding a new rule to a ruleset according to some aspects of the present disclosure.

Turning now to FIG. 3, shown is an example of a graphical user interface 112 for adding a new rule to a rule database 108 according to some aspects of the present disclosure. This example is intended to be illustrative and non-limiting. Other examples may include more graphical features, fewer graphical features, different graphical features, or a different configuration of graphical features than is shown in FIG. 3.

As shown, the graphical user interface 112 can include a first graphical element 304 (e.g., a button) that is selectable to add a new condition field 302 to the form. A user can select the first graphical element 304 any number of times to add any number of condition fields 302 to the form. Each time the first graphical element 304 is selected, the graphical user interface 112 can dynamically add another condition field 302 to the form.

In this example, there are seven condition fields corresponding to seven conditions of a single rule. The seven conditions are of different types—the first condition is a date range condition, the second condition is a time condition, the third condition is an entity condition, the fourth condition is an offering condition, the fifth condition is a first user-attribute condition, the sixth condition is a second user-attribute condition, and the seventh condition is an account attribute condition. Of course, other examples may involve more, fewer, or different types of conditions depending on the user's selections from the pulldown menus. For each condition field, the user may be able to select a condition type from a pulldown menu of available condition types and input corresponding condition parameters. The form can also include radio buttons for selecting a binary operator ("and" or "or") associated with pairs of condition fields. A user may also be able to rearrange the order of the condition fields, for example by dragging-and-dropping them into a new sequence. If a user accidentally added a condition field or otherwise wants to remove a condition field, the user can select a delete button 310 to remove the corresponding condition field from the form.

The graphical user interface 112 can also include a second graphical element 308 that is selectable to add a new action field to the form. A user can select the second graphical element 308 any number of times to add any number of action fields 306 to the form. Each time the second graphical element 308 is selected, the graphical user interface 112 can dynamically add another action field 306 to the form.

In this example, there are two action fields corresponding to two actions of a single rule. The two actions are of different types—the first action is a point increase action and the second action is an account upgrade action. Of course, other examples may involve more, fewer, or different types of actions depending on the user's selections from the pulldown menus. For each action field, the user may be able to select an action type from a pulldown menu of available action types and input corresponding action parameters. A user may also be able to rearrange the order of the action fields, for example by dragging-and-dropping them into a new sequence. This may control the order in which the actions are executed by the rule engine. If a user accidentally added an action field or otherwise wants to remove an action field, the user can select a delete button 312 to remove the corresponding action field from the form.

Once the user has made their selections, the user can select a submit button 310 to submit the rule parameters (e.g., the conditions and actions) to the rule engine. The rule engine can then translate the rule parameters into a rule definition and store the rule definition in the rule database. The rule engine can then apply the rule definition against user data to determine whether the user data matches the rule.

As described earlier, a rule may involve a specific entity. For example, condition 3 of the graphical user interface 112 requires that an interaction involve a specific entity to match the rule. In some such examples, the rule engine may only apply that rule if the user's online account is linked to another online account associated with that entity. This may help to reduce the total number of rules applied, among other things. One example of a process for linking online accounts is described below with respect to FIGS. 4A-B. Of course, other examples may involve more steps, fewer steps, different steps, or a different order of steps than is shown in FIGS. 4A-B.

Figure 4A:
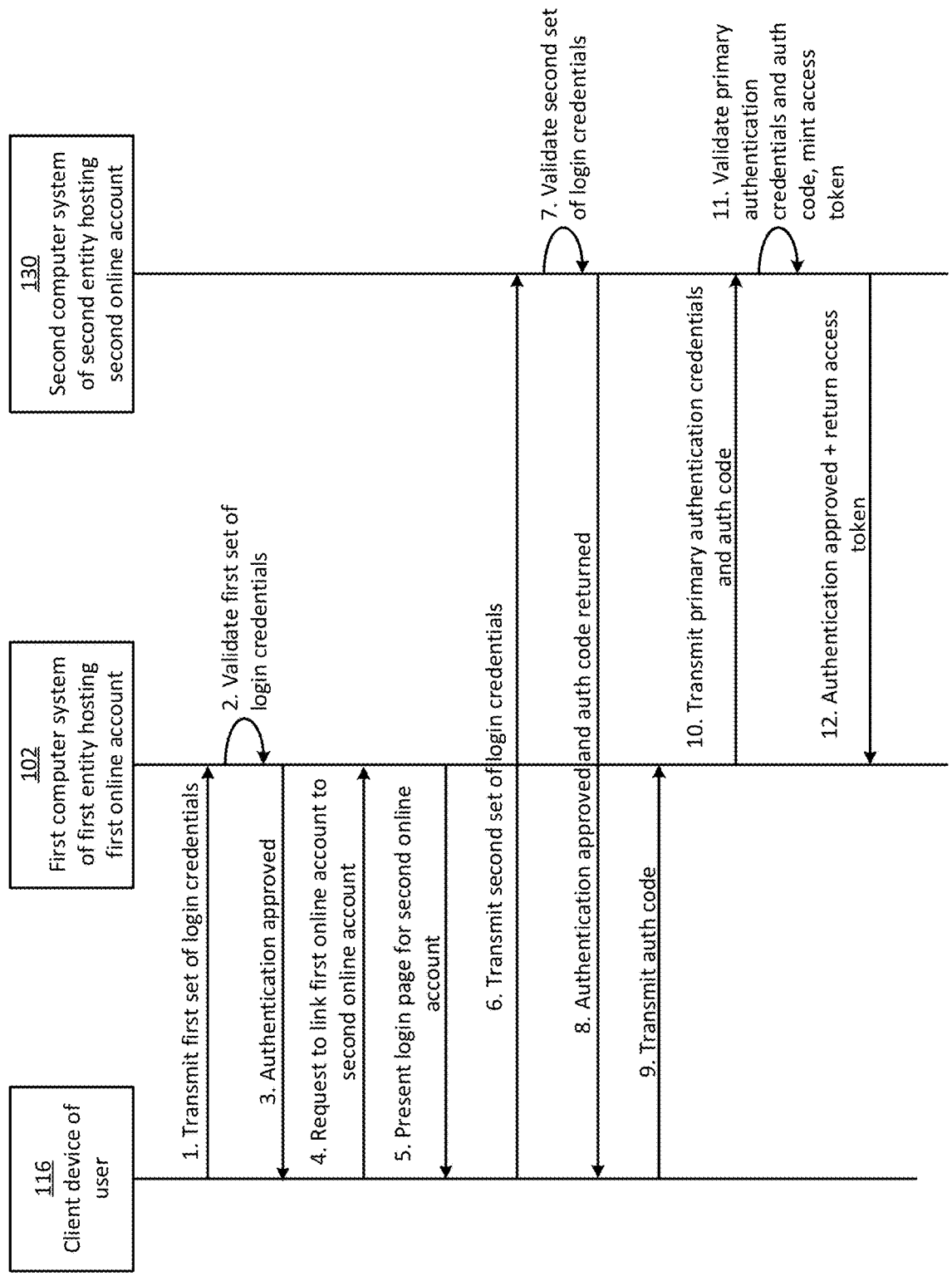
FIGS. 4A-B show a sequence diagram of an example of a process for securely linking online accounts according to some aspects of the present disclosure.
Figure 4B:
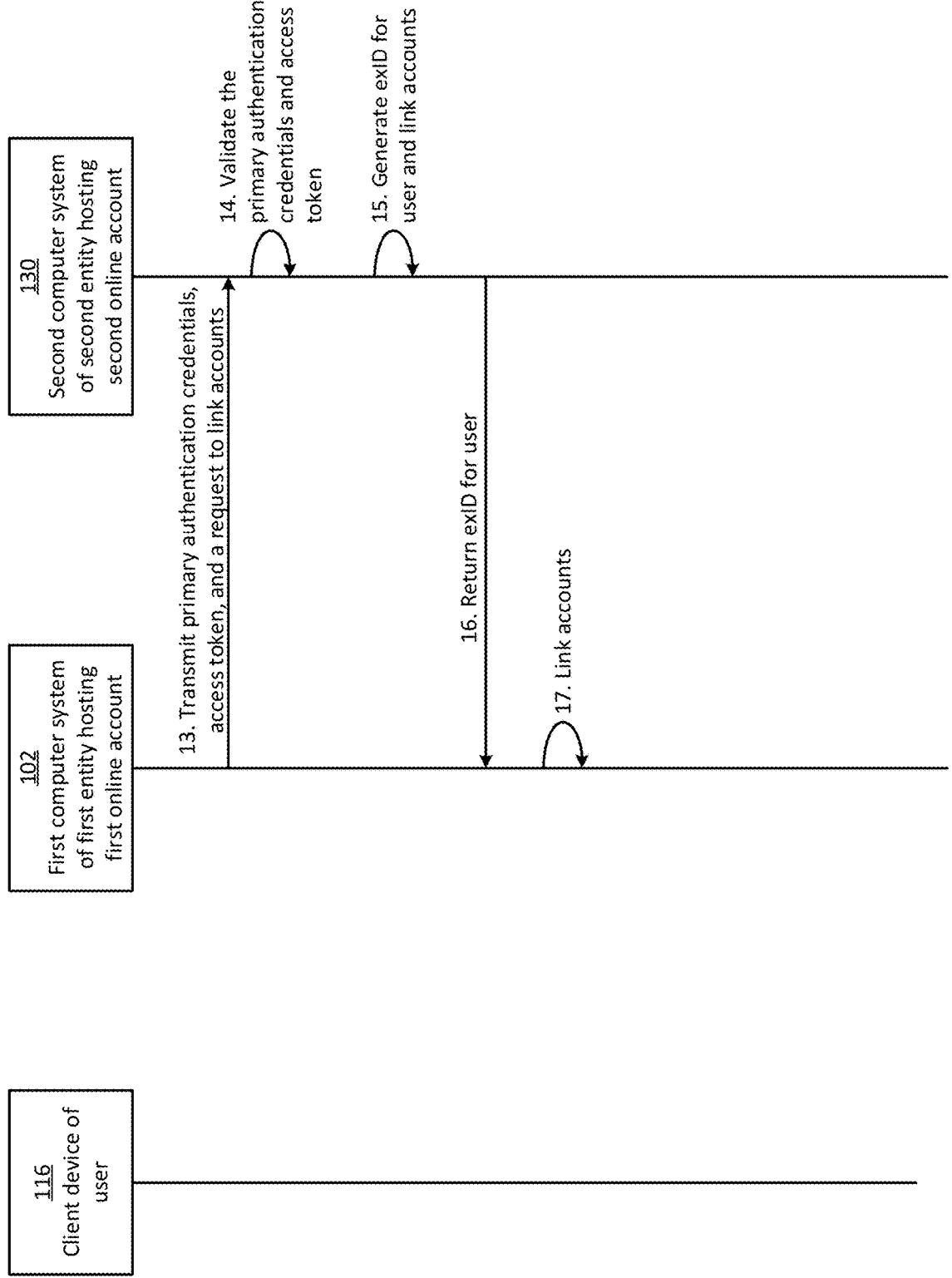

Referring now to FIG. 4A, shown is a sequence diagram of an example of a process for linking a first online account and a second online account. The process can begin at step 1 with the client device 116 transmitting a first set of login credentials to a first computer system 102 for logging into the first online account, which is hosted by a first entity. The first set of login credentials can include one or more login credentials. Examples of such login credentials can include a username, a password, a biometric marker, a pin code, or any combination of these. The first set of login credentials may have previously been selected by the user, for example when signing up for the first online account. At step 2, the first computer system 102 can validate the first set of login credentials. If the first set of login credentials are valid, at step 3, the first computer system 102 can transmit a first authentication approval to the client device 116.

At step 4, the client device 116 can transmit a request to link the first online account to a second online account of the user, where the second online account is hosted by a second entity. At step 5, the first computer system 102 can present a login page for the second online account to the client device 116. The login page can be for receiving a second set of login credentials for accessing the second online account. The second set of login credentials can include one or more login credentials, such as a username, a password, a biometric marker, a pin code, or any combination of these. The second set of login credentials may have previously been selected by the user, for example when signing up for the second online account. At step 6, the client device 116 can transmit the second set of login credentials to a second computer system 130 hosting the second online account, for use in accessing the second online account.

At step 7, the second computer system 130 can validate the second set of login credentials. If the second set of login credentials are valid, at step 8, the second computer system 130 can transmit a second authentication approval to the client device 116. The second computer system 130 can also generate an authentication code and provide it to the client device 116. The authentication code may be a numerical code, an alphanumerical code, or another type of code generated using a code generator. The authentication code may be unique to a session initiated between the second computer system 130 and the client device 116.

At step 9, the client device 116 can provide the authentication code to the first computer system 102. The first computer system 102 can receive the authentication code and forward it to the second computer system 130, along with primary authentication credentials, at step 10. The primary authentication credentials can be different from the first set of login credentials and the second set of login credentials, at least because the primary authentication credentials are not associated with the user. Rather, the primary authentication credentials are specific to the first computer system 102 for authenticating with the second computer system 130. The primary authentication credentials may have been previously set by the first computer system 102 or the second computer system 130. The first set of login credentials and second set of login credentials can be considered secondary authentication credentials as compared to the primary authentication credentials of the first computer system 102.

At step 11, the second computer system 130 can validate the primary authentication credentials and the authentication code. If the primary authentication credentials and the authentication code are valid, the second computer system 130 can generate an access token. The access token is different from the authentication code, the first set of login credentials, the second set of login credentials, and the primary authentication credentials. In some examples, the second computer system 130 can mint the access token using a token generator, which may be different from the code generator used to generate the authentication code. At step 12, the second computer system 130 can transmit a third authentication approval to the first computer system 102 along with the access token. The process can then continue as shown in FIG. 4B.

Referring now to FIG. 4B, at step 13 the first computer system 102 transmits the primary authentication credentials, the access token, and a request to link the first online account and the second online account. The second computer system 130 can receive the primary authentication credentials, the access token, and the request. At step 14, the second computer system 130 can validate the primary authentication credentials and the access token.

If they are valid, the second computer system 130 can generate an external ID (exID) at step 15. The external account identifier can be a unique identifier of the second online account that is generated by the second computer system 130, and that is different from an internal account identifier used by the second computer system 130 to identify the second online account. The second computer system 130 can use the exID to refer to the second online account 130 when communicating with external computing systems, such as the first computing system 102. This can prevent the second computer system 130 from exposing sensitive information, like the internal account identifier, to other entities. At step 15, the second computer system 130 can also link the two accounts, for example by storing a link between the two accounts in an account link datastore.

At step 16, the second computer system 130 can transmit the exID for the user to the first computer system 102. The first computer system 102 can receive the exID and save it. At step 17, the first computer system 102 may also link the two accounts, for example by storing a link between the two accounts in an account link datastore.

Although the process shown in FIGS. 4A-B relates to linking two online accounts together, this process can be used to link any number and types of online accounts together. For example, the first online account can be linked to two or more other online accounts using the techniques described herein. And although the second computer system 130 generated the exID in the above example, in other examples the first computer system 102 can generate an exID and provide it to the second computer system 130.

The above process employs multiple layers of authentication to improve security—a first layer in which the user authenticates with the first computer system using the first set of login credentials, a second layer in which the user authenticates with the second computer system 130 using the second set of login credentials, and a third layer in which the first computer system 102 authenticates with the second computer system 130 using the authentication code and primary authentication credentials. The computer systems 102, 130 may also employ other security mechanisms, such as a list of authorized internet protocol (IP) addresses that are allowed to submit commands to their APIs. This multi-faceted security architecture can prevent malicious actors from abusing the system, for example by requiring that all commands originate from an authorized IP address that has been authenticated using the primary authentication credentials.

FIGS. 5-8 show examples of graphical user interface pages for linking online accounts according to some aspects of the present disclosure. But, it should be appreciated that these examples are intended to be illustrative and non-limiting. In other examples, the GUI 112 may have more pages, fewer pages, different pages, or a different order of pages than is shown. And, each GUI page may have different graphical elements than is shown.

Figure 5:
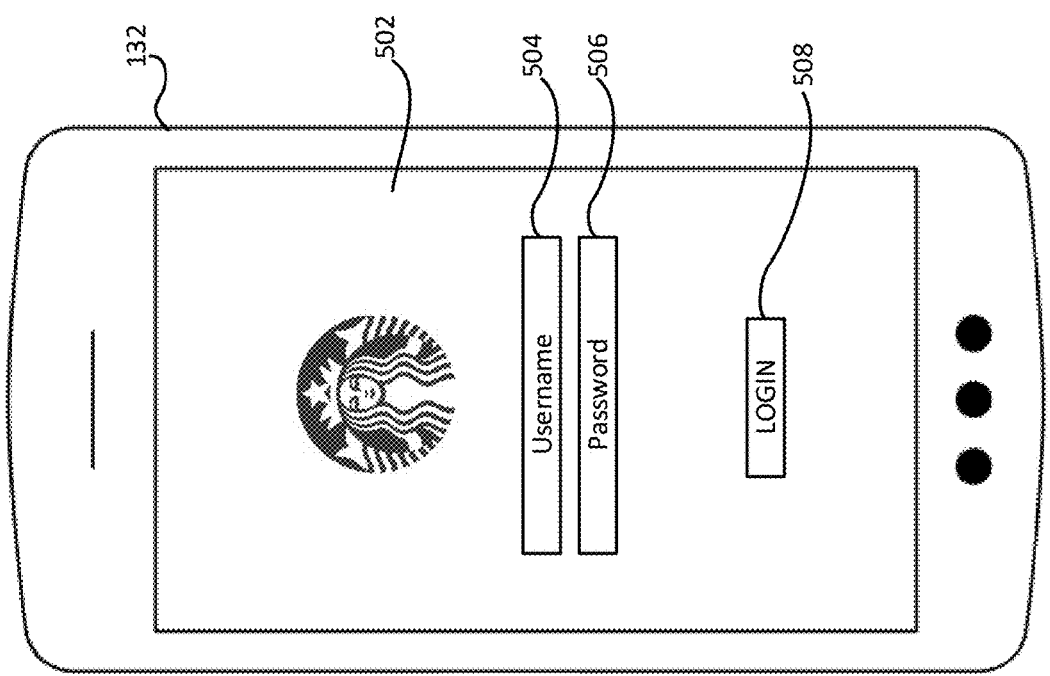

Referring now to FIG. 5, shown is an example of a first GUI page 502 displayed on a user device 132. The first GUI page 502 can be a login page through which a user can login to their first online account. The user can input their first set of login credentials to the input boxes 504, 506. In this example, the first set of login credentials include a username and password. After entering the first set of login credentials, the user can press a login button 508 access the first online account.

Figure 6:
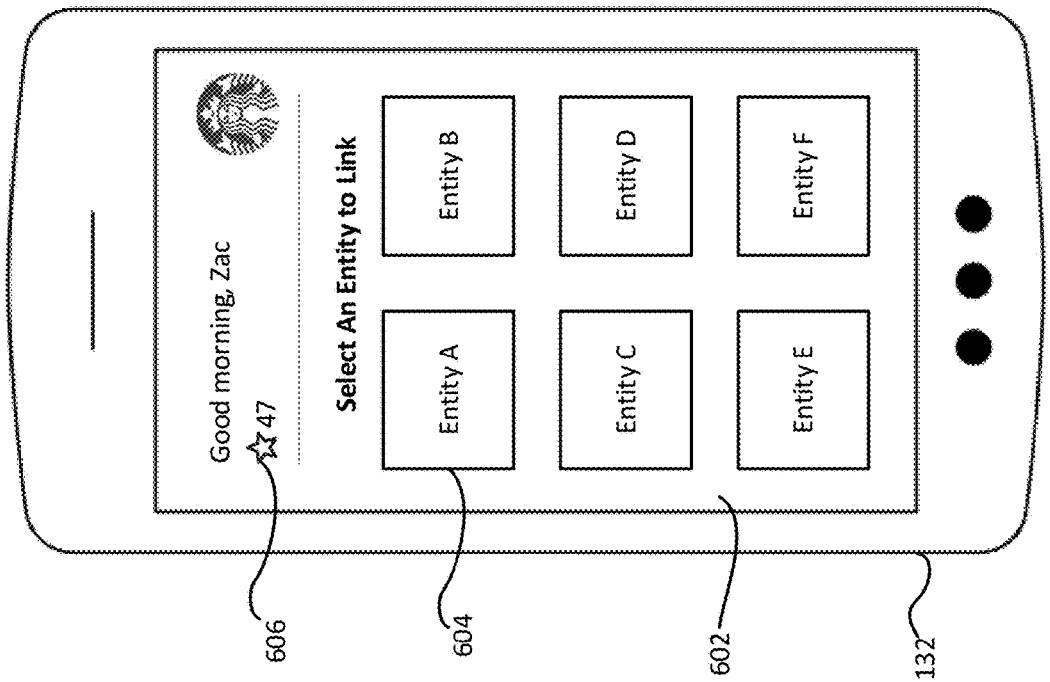
FIGS. 5-8 show examples of graphical user interface pages for linking online accounts according to some aspects of the present disclosure.

Once logged in, the user can choose to link the first online account to a second online account. The user may be able to select the second online account via a second GUI page. One example of the second GUI page 602 is shown in FIG. 6. As shown, the second GUI page 602 can include graphical objects representing various entities. Examples of the graphical objects can include icons, logos, or textual content representing the various entities. Each entity may offer an online account that is capable of being linked to the first online account. The second GUI page 602 can also indicate a total number of points 606 assigned to the first online account. Points may be added or subtracted from the point total 606 by the rule engine based on various rules. The user can select a graphical object 604 corresponding to a target entity, at which point the GUI can transition to a third GUI page.

Figure 8:
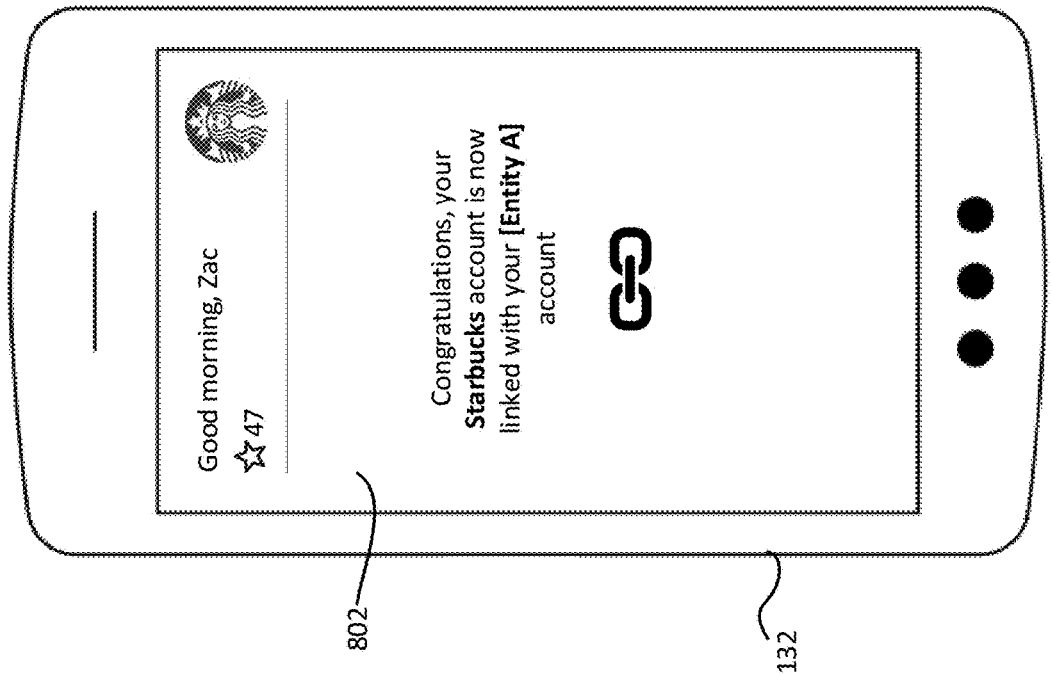
Figure 7:
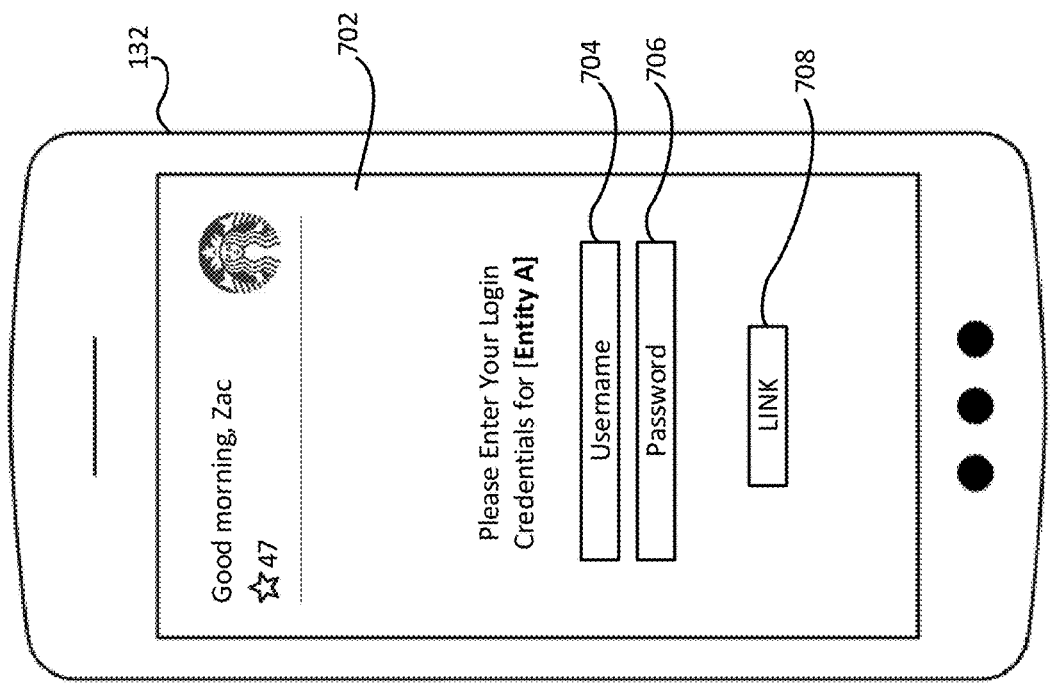

One example of the third GUI page 702 is shown in FIG. 7. As shown, the third GUI page 702 can be another login page through which a user can input a second set of login credentials for a second online account with the selected entity. The user can input the second set of login credentials to the input boxes 704, 706. In this example, the second set of login credentials include a username and password. The second set of login credentials can be different from the first set of login credentials. After entering the second set of login credentials, the user can press a link button 708 to initiate the account-linking process described above. Once the account-linking process is complete, the GUI may transition to a fourth GUI page 802 indicating that the account-linking process was successful. An example of the fourth GUI page 802 is shown in FIG. 8.

The combination of features described above can allow a user to easily link their online accounts together and an administrator to easily craft rules to be applied to the linked accounts. Because the rule engine may only apply certain rules if the online accounts are linked together, the user may have a level of control over which rules are applied by selecting which of their online accounts to link together. The result can be a flexible rule architecture that can be at least partially controlled by the user and at least partially controlled by the administrator.

Turning now to FIG. 9, shown is a flowchart of an example of a process for providing a graphical user interface and a flexible architecture for a rule engine according to some aspects of the present disclosure. Other examples may involve more operations, fewer operations, different operations, or a different order of operations than is shown in FIG. 9. The operations of FIG. 9 are described below with reference to the components of FIG. 1.

In block 902, a computer system provides a graphical user interface 112 that includes a set of graphical input elements for receiving a selected condition and a selected action for a new rule. An example of the computer system may be the first computer system 102 of FIG. 1. The new rule can be a rule that is to be added to a rule database 108 and that may not already exist in the rule database 108.

In block 904, the computer system generates a new rule definition 120 based on the selected condition and the selected action. The new rule definition 120 is a rule definition for the new rule. Generating the new rule definition can involve converting the selected condition and the selected action into the new rule definition 120. For example, the computing device may include a predefined rule template. The rule template can include preexisting information and empty fields, into which the selected condition and the selected action can be inserted to produce the rule definition 120. In some examples, the rule definition 120 can be a string or array configured to be rapidly ingested and processed by the rule engine.

In block 906, the computer system stores the new rule definition 120 in a rule database 108. The rule database 108 may be internal or external to the computing device. The rule database 108 can include one or more other rule definitions 120 for one or more other rules, which may or may not have been created using the graphical user interface 112.

In block 908, the computer system (e.g., a rule engine 106 executing on the computer system) selects at least one rule definition 120 from the rule database 108. For example, the computer system can select a subset of rule definitions from among a plurality of rule definitions in the rule database. The selected subset of rule definitions may or may not include the new rule definition. The selected subset of rule definitions can correspond to a subset of rules. The computer system can then apply the at least one rule to user data 122, which may correspond to a single user or multiple users.

The computer system can select the at least one rule definition based on any number and combination of factors. For example, the computer system can select a subset of rule definitions based on the content of the user data 122. In some such examples, the user data 122 may involve a transaction with a particular entity (e.g., the first entity 104 or a second entity 124), for which a corresponding set of rules may be stored in the rule database 108. Based on the user data 122 involving that particular entity, the computer system can select the corresponding set of rule definitions from the rule database 108. As another example, the computer system can select a subset of rule definitions based on which of the user's online accounts are linked together. The computer system may only select certain rule definitions if they are associated with a linked online account. As still another example, certain rules may only be applicable to online accounts that have certain attributes. So, the computer system can select a subset of rule definitions based on the attributes of the user's online account. As yet another example, certain rules may only be applicable to users that have certain attributes. So, the computer system can select a subset of rule definitions based on the attributes of the user. Some or all of these may be implemented to intelligently reduce the total number of rules applied.

In block 910, the computer system issues a command configured to cause at least one action associated with the at least one rule to be executed. The computer system can issue the command in response to determining that the user data 122 matches the at least one rule. In some examples, the computer system can issue the command to its own software for causing the at least one action to be executed on the computer system. In other examples, the computer system can issue the command to a remote computing device for causing the remote computing device to execute the at least one action. For instance, the computer system can transmit the command to a remote computing device via a network for causing the remote computing device to execute the at least one action. The at least one action may involve increasing or decreasing a point total 134 associated with an online account, such as the first online account 128 or the second online account 136.

Figure 10:
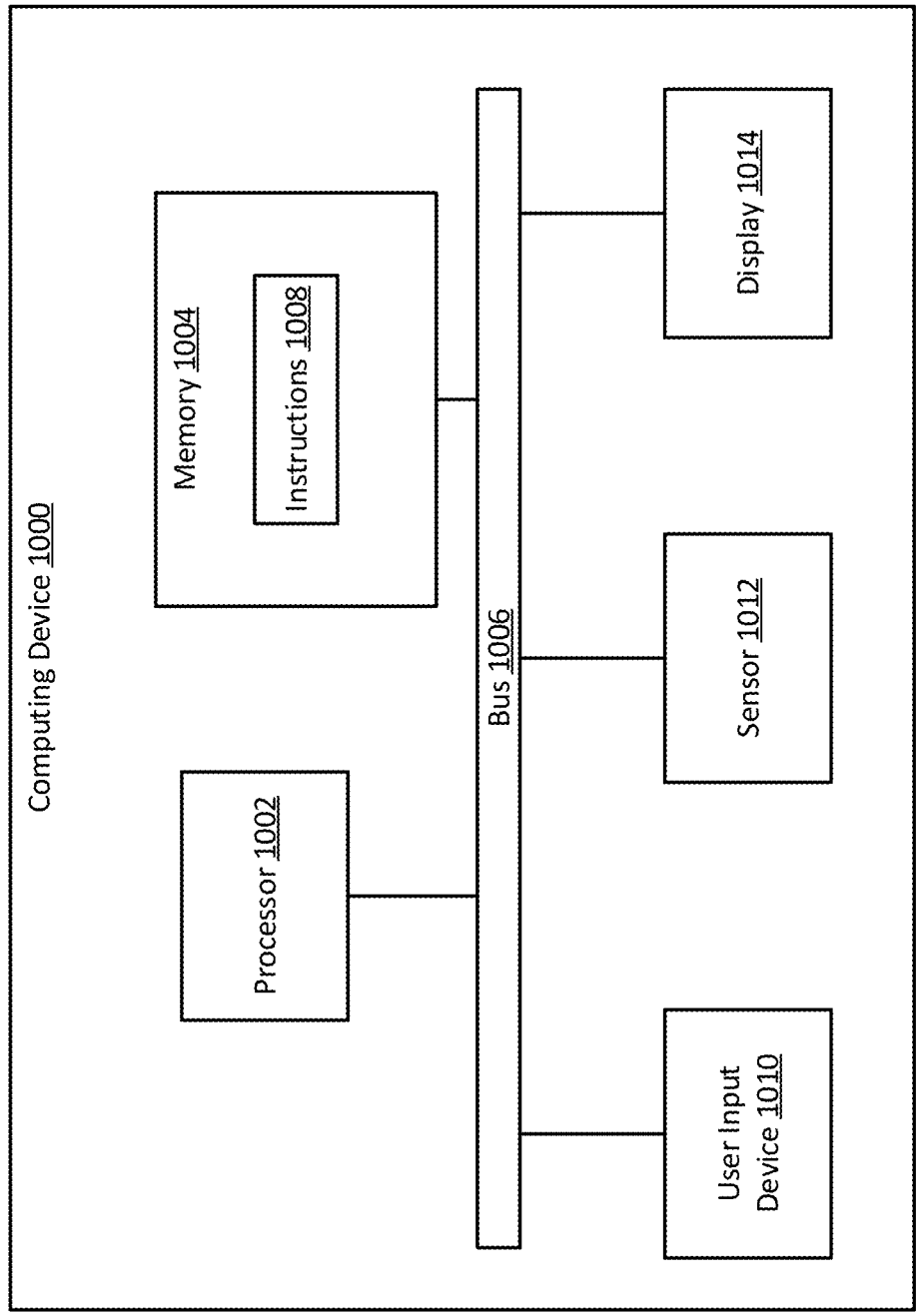
FIG. 10 shows a block diagram of an example of a computing device for implementing some aspects of the present disclosure.

FIG. 10 shows a block diagram of an example of a computing device 1000 usable to implement some aspects of the present disclosure. In some examples, the computing device 1000 may correspond to the first computer system 102, the second computer system 130, the client device 116, or the user device 132 of FIG. 1. Additionally or alternatively, the computing device can correspond to the computer system described above with respect to FIG. 9. The computing device 1000 may include a server, a desktop computer, a laptop computer, a tablet, a smart phone, a wearable device, etc.

The computing device 1000 includes a processor 1002 communicatively coupled to a memory 1004 by a bus 1006. The processor 1002 can include one processor or multiple processors. Examples of the processor 1002 can include a Field-Programmable Gate Array (FPGA), an application-specific integrated circuit (ASIC), or a microprocessor. The processor 1002 can execute instructions 1008 stored in the memory 1004 to perform operations, such as any of the operations described herein. The instructions 1008 may include processor-specific instructions generated by a compiler or an interpreter from code written in any suitable computer-programming language, such as C, C++, C #, Java, or Python.

The memory 1004 can include one memory device or multiple memory devices. The memory 1004 can be volatile or non-volatile (it can retain stored information when powered off). Examples of the memory 1004 can include electrically erasable and programmable read-only memory (EEPROM), flash memory, or cache memory. At least some of the memory 1004 includes a non-transitory computer-readable medium from which the processor 1002 can read instructions 1008. A computer-readable medium can include electronic, optical, magnetic, or other storage devices capable of providing the processor 1002 with the instructions 1008 or other program code. Examples of a computer-readable mediums include magnetic disks, memory chips, ROM, random-access memory (RAM), an ASIC, a configured processor, and optical storage.

The computing device 1000 also includes input components. One example of an input component can include the user input device 1010, which may include one user input device or multiple user input devices. Examples of such user input devices can include a mouse, a keyboard, a touchpad, and a touch-screen display. Another example of an input component can include the sensor 1012, which may include one sensor or multiple sensors. Examples of such sensors can include a GPS unit, a gyroscope, an accelerometer, an inclinometer, and a camera.

The computing device 1000 further includes output components. One example of an output component can include the display 1014, which may include one display or multiple displays. Examples of such displays can include a liquid crystal display (LCD) or a light-emitting diode (LED) display. The computing device 1000 may also include an audio output component such as a speaker, a haptic output component such as a haptic actuator, or another type of output component. But for simplicity, these other output components are not shown in FIG. 10.

While FIG. 10 depicts various components (e.g., processor 1002, memory 1004, user input device 1010, and display 1014) as being internal to a single housing, in other examples the components may be distributed and in wired or wireless communication with one another. For example, the display 1014 may be a computer monitor that is separate from and in communication with the computing device 1000 that performs the main processing. And although FIG. 10 depicts a certain number and arrangement of components, this is for illustrative purposes and not intended to be limiting. Other examples can include more components, fewer components, different components, or a different arrangement of the components shown in FIG. 10.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A non-transitory computer-readable medium comprising program code that is executable by one or more processors for causing the one or more processors to perform operations including:
   providing a graphical user interface that includes a set of graphical input elements for receiving a selected condition and a selected action for a new rule;
   generating a new rule definition for the new rule based on the selected condition and the selected action;
   storing the new rule definition in a rule database, the rule database including a plurality of rule definitions for a plurality of rules;
   executing a rule engine configured to:
      select a subset of rule definitions from the plurality of rule definitions in the rule database, wherein the subset of rule definitions includes the new rule definition, and wherein the subset of rule definitions correspond to a subset of rules from among the plurality of rules; and
      apply the subset of rule definitions to user data to determine whether the user data matches the subset of rules; and
   in response to determining that the user data matches at least one rule in the subset of rules, issuing a command for causing at least one action associated with the at least one rule to be executed.

2. The non-transitory computer-readable medium of claim 1, wherein the at least one action includes adjusting a point total associated with an account of a user.

3. The non-transitory computer-readable medium of claim 2, wherein the account is hosted on a computer system of a first entity, the user data describes an interaction between the user and a second entity that is different from the first entity, and further comprising program code that is executable by the one or more processors for causing the one or more processors to receive the user data in a data communication from the second entity via a network.

4. The non-transitory computer-readable medium of claim 3, further comprising program code that is executable by the one or more processors for causing the one or more processors to:
receive the selected condition and the selected action from the first entity.

5. The non-transitory computer-readable medium of claim 3, further comprising program code that is executable by the one or more processors for causing the one or more processors to:
receive at least one rule among the plurality of rules from the second entity.

6. The non-transitory computer-readable medium of claim 3, further comprising program code that is executable by the one or more processors for causing the one or more processors to:
select the subset of rules definitions, from among the plurality of rule definitions in the rule database, based on the subset of rules being associated with the second entity.

7. The non-transitory computer-readable medium of claim 2, wherein adjusting the point total includes increasing the point total by a predefined amount.

8. The non-transitory computer-readable medium of claim 2, wherein adjusting the point total includes decreasing the point total by a predefined amount.

9. The non-transitory computer-readable medium of claim 1, further comprising program code that is executable by the one or more processors for causing the one or more processors to:
receive an output from the rule engine indicating that the user data matched at least two rules of the subset of rules, the at least two rules being associated with at least two actions;
determine a prioritized execution sequence that defines an order in which the at least two actions are to be executed based on a predefined priority scheme; and
execute the prioritized execution sequence.

10. The transitory computer-readable medium of claim 1, wherein the graphical user interface further comprises a graphical input element that is selectable by a user to add an additional condition to the new rule, the additional condition being different from the selected condition.

11. The transitory computer-readable medium of claim 1, wherein the graphical user interface further comprises a graphical input element that is selectable by a user to add an additional action to the new rule, the additional action being different from the selected condition.

12. The transitory computer-readable medium of claim 1, wherein the graphical user interface further comprises a graphical input element that is selectable by a user to remove an existing rule definition corresponding to an existing rule from the rule database, the existing rule being different from the new rule.

13. A method comprising:
providing, by one or more processors, a graphical user interface that includes a set of graphical input elements for receiving a selected condition and a selected action for a new rule;
generating, by the one or more processors, a new rule definition for the new rule based on the selected condition and the selected action;
storing, by the one or more processors, the new rule definition in a rule database, the rule database including a plurality of rule definitions for a plurality of rules;
executing, by the one or more processors, a rule engine configured to:
select a subset of rule definitions from the plurality of rule definitions in the rule database, wherein the subset of rule definitions includes the new rule definition, and wherein the subset of rule definitions correspond to a subset of rules from among the plurality of rules; and
apply the subset of rule definitions to user data to determine whether the user data matches the subset of rules; and
in response to determining that the user data matches at least one rule in the subset of rules, issuing, by the one or more processors, a command for causing at least one action associated with the at least one rule to be executed.

14. The method of claim 13, wherein the at least one action includes adjusting a point total associated with an account of a user.

15. The method of claim 14, wherein the account is hosted on a computer system of a first entity, the user data describes an interaction between the user and a second entity that is different from the first entity, and further comprising receiving the user data in a data communication from the second entity via a network.

16. The method of claim 15, further comprising:
receiving the selected condition and the selected action from the first entity.

17. The method of claim 15, further comprising:
receiving at least one rule among the plurality of rules from the second entity.

18. The method of claim 15, further comprising:
selecting the subset of rules definitions, from among the plurality of rule definitions in the rule database, based on the subset of rules being associated with the second entity.

19. The method of claim 15, wherein the account is a first account, and further comprising:
determining that the first account of the user with the first entity is linked to a second account of the user with the second entity; and
in response to the determining that the first account is linked to the second account, selecting the subset of rules definitions from the rule database based on the subset of rules being associated with the second entity in the rule database.

20. The method of claim 14, wherein adjusting the point total includes increasing the point total by a predefined amount.

21. The method of claim 14, wherein adjusting the point total includes decreasing the point total by a predefined amount.

22. The method of claim 13, further comprising:
receiving an output from the rule engine indicating that the user data matched at least two rules of the subset of rules, the at least two rules being associated with at least two actions;
determining that the at least two actions conflict with one another; and
based on determining that the at least two actions conflict with one another, executing a first action of the at least two actions and ignoring a second action of the at least two actions.

23. A system comprising:
one or more processors; and
one or more memories including instructions that are executable by the one or more processors for causing the one or more processors to perform operations including:

providing a graphical user interface that includes a form with a set of graphical input elements for allowing a user to custom define a new rule, the set of graphical input elements including a first graphical input element configured to allow the user to select a condition for the new rule, and the set of graphical input elements including a second graphical input element configured to allow the user to select an action for the new rule independently of the condition, wherein the graphical user interface further comprises a submit button that is selectable by the user to save the new rule;

in response to detecting a selection of the submit button, generating a new rule definition for the new rule, wherein the new rule definition specifies the condition and the action selected by the user;

storing the new rule definition in a rule database for subsequent use, the rule database including a plurality of rule definitions for a plurality of rules; and subsequent to storing the new rule definition in the rule database:

selecting a subset of rule definitions from the plurality of rule definitions in the rule database, wherein the subset of rule definitions includes the new rule definition, and wherein the subset of rule definitions correspond to a subset of rules from among the plurality of rules;

applying the subset of rule definitions to user data to determine whether the user data matches the subset of rules; and in response to determining that the user data matches at least one rule in the subset of rules, issuing a command for causing at least one action associated with the at least one rule to be executed.

\* \* \* \* \*